United States Patent
Otto et al.

(10) Patent No.: US 9,694,462 B2
(45) Date of Patent: Jul. 4, 2017

(54) DAMPING DEVICE FOR A SPINDLE OF A GRINDING MACHINE AND GRINDING MACHINE COMPRISING A DAMPING DEVICE

(71) Applicant: Schaudt Mikrosa GmbH, Leipzig (DE)

(72) Inventors: Karsten Otto, Doebeln (DE); Michael Maeurer, Leipzig (DE)

(73) Assignee: SCHAUDT MIKROSA GMBH (DE)

( * ) Notice: Subject to any disclaimer, the term of this patent is extended or adjusted under 35 U.S.C. 154(b) by 23 days.

(21) Appl. No.: 14/714,250

(22) Filed: May 16, 2015

(65) Prior Publication Data
US 2015/0328744 A1 Nov. 19, 2015

(30) Foreign Application Priority Data
May 16, 2014 (DE) .................. 10 2014 106 926

(51) Int. Cl.
 *B24B 5/18*   (2006.01)
 *B24B 45/00*   (2006.01)
 (Continued)

(52) U.S. Cl.
 CPC ............ *B24B 5/04* (2013.01); *B24B 5/18* (2013.01); *B24B 5/30* (2013.01); *B24B 5/35* (2013.01);
 (Continued)

(58) Field of Classification Search
CPC .......... B24B 41/04; B24B 5/18; F16F 7/1028
(Continued)

(56) References Cited

U.S. PATENT DOCUMENTS

| 2,112,695 A | 3/1938 | Forss |
| 2,582,873 A * | 1/1952 | Larson .................. B24B 41/04 |
| | | 403/339 |

(Continued)

FOREIGN PATENT DOCUMENTS

| DE | 697 06 404 T2 | 6/2002 |
| DE | 10-2004-032177 A1 | 1/2006 |

(Continued)

OTHER PUBLICATIONS

EPO Search Report dated Oct. 21, 2015, for European Patent Application No. 15167585.7, (8 pages).

(Continued)

*Primary Examiner* — Joseph J Hail
*Assistant Examiner* — J Stephen Taylor
(74) *Attorney, Agent, or Firm* — Lewis Roca Rothgerber Christie LLP (57) ABSTRACT

The present disclosure relates to a grinding machine. More particularly, the present disclosure relates to a centerless grinding machine comprising a damping device. The present disclosure also relates to a spindle for a grinding machine, and to a damping device for a spindle of a grinding machine, particularly for a grinding spindle or regulator spindle of a centerless grinding machine, wherein the damping device comprises at least one damping unit including an auxiliary mass section, an elastic section and a damping section, which are integrated in the spindle, and which jointly define a damped vibratory system for increasing the dynamic stiffness of the spindle.

20 Claims, 5 Drawing Sheets

(51) Int. Cl.
*B23B 19/02* (2006.01)
*F16F 15/16* (2006.01)
*F16F 15/173* (2006.01)
*F16F 15/12* (2006.01)
*F16F 15/10* (2006.01)
*B23Q 1/26* (2006.01)
*B24B 5/04* (2006.01)
*B24B 5/30* (2006.01)
*B24B 5/35* (2006.01)
*B24B 41/00* (2006.01)
*F16F 7/108* (2006.01)
*B24B 41/04* (2006.01)

(52) U.S. Cl.
CPC .......... *B24B 41/002* (2013.01); *B24B 41/007* (2013.01); *B24B 41/04* (2013.01); *F16F 7/108* (2013.01); *F16F 15/10* (2013.01)

(58) Field of Classification Search
USPC ..... 451/121, 134, 242, 178, 194; 74/573.12; 188/379, 380; 464/180; 409/141
See application file for complete search history.

(56) References Cited

U.S. PATENT DOCUMENTS

| | | | | |
|---|---|---|---|---|
| 2,621,452 A * | 12/1952 | Wells | ................... | B23B 31/201 451/294 |
| 3,207,014 A * | 9/1965 | Carlstedt | ................ | B23Q 1/76 188/381 |
| 3,560,062 A * | 2/1971 | Kun | ..................... | F16C 17/20 384/115 |
| 3,570,191 A * | 3/1971 | Williams | ............... | B24B 41/04 384/100 |
| 3,642,378 A | 2/1972 | Hahn et al. | | |
| 3,650,582 A * | 3/1972 | Casey | ................ | F16C 32/0651 277/432 |
| 3,692,370 A | 9/1972 | Hasz | | |
| 4,206,953 A * | 6/1980 | Diehl | ..................... | B23Q 1/38 269/63 |
| 4,441,280 A * | 4/1984 | Wetzels | ................. | B24B 41/02 451/242 |
| 4,607,420 A * | 8/1986 | Vomhoff | ................ | B29C 43/46 100/162 B |
| 4,730,596 A * | 3/1988 | Maack | .................... | B23Q 1/38 125/11.03 |
| 4,763,448 A * | 8/1988 | Yoshioka | ................. | B24B 5/18 451/14 |
| 5,001,820 A * | 3/1991 | Yoshida | ................. | B21B 27/05 492/2 |
| 5,420,664 A * | 5/1995 | Miwa | .................... | F16F 15/126 399/167 |
| 6,036,414 A | 3/2000 | Azema | | |
| 6,050,756 A * | 4/2000 | Buchholz | ................ | B24B 41/04 137/896 |
| 6,200,204 B1 * | 3/2001 | Helgren | ............. | B23Q 11/0032 451/124 |
| 7,341,550 B2 * | 3/2008 | van Haag | .............. | D21G 1/008 101/216 |
| 7,661,912 B2 * | 2/2010 | Onozuka | ............... | B23B 29/022 188/322.5 |
| 7,681,869 B2 * | 3/2010 | Digernes | ............... | B23B 29/022 267/137 |
| 2006/0053960 A1 | 3/2006 | Stierle et al. | | |
| 2010/0129170 A1 * | 5/2010 | Wilmot | .................... | B23C 3/32 409/143 |
| 2015/0231706 A1 | 8/2015 | Frank | | |

FOREIGN PATENT DOCUMENTS

| | | |
|---|---|---|
| EP | 1 266 710 A1 | 12/2002 |
| FR | 975 056 A | 3/1951 |
| WO | WO 97/30820 A1 | 8/1997 |
| WO | WO 2014/033020 A1 | 3/2014 |

OTHER PUBLICATIONS

EP Office action dated Mar. 15, 2017 for corresponding European Patent application 4828P112EP (5 pages).

* cited by examiner

DAMPING DEVICE FOR A SPINDLE OF A GRINDING MACHINE AND GRINDING MACHINE COMPRISING A DAMPING DEVICE

CROSS-REFERENCES TO RELATED APPLICATIONS

This application claims priority from German patent application 10 2014 106 926.9, filed on May 16, 2014. The entire content of that priority application is fully incorporated by reference herewith.

The present disclosure relates to a damping device for a spindle of a grinding machine, particularly a damping device for a grinding spindle or regulator spindle of a centerless grinding machine. The present disclosure further relates to a spindle for a grinding machine that is provided with a damping device, particularly to a grinding spindle or regulator spindle of a centerless grinding machine. The present disclosure further relates to a grinding machine, particularly to a centerless grinding machine for machining workpieces, particularly for external cylindrical grinding.

BACKGROUND

Grinding machines for machining workpieces are generally known in the art. Also centerless grinding machines as such are known in the art, particularly centerless cylindrical grinding machines. Centerless cylindrical grinding machines may be for instance arranged as external cylindrical grinding machines or internal cylindrical grinding machines. Generally, centerless grinding machines may be utilized for machining round, cylindrical workpieces, and exemplarily rotationally symmetric workpieces. Centerless grinding machines may be used for plunge grinding or for through-feed grinding, for instance.

Centerless grinding machines are particularly suited for series production and for mass production. Centerless grinding machines typically comprise a grinding wheel and a regulating wheel, wherein both the grinding wheel and the regulating wheel may be driven for rotation. The grinding wheel and the regulating wheel are generally arranged in a fashion parallel to one another and arranged to receive a to-be-machined workpiece therebetween. Generally, the grinding wheel comprises an abrasive material or is coated with an abrasive material. Generally, an abrasive material may be referred to as a material that is abrasively effective. The regulating wheel may comprise rubber material, rubber-like material and/or may be coated with rubber material and/or rubber-like material. In the alternative, the regulating wheel may comprise ceramic material and/or may be coated with ceramic materials Generally, centerless grinding machines further comprise a workpiece mount which serves as a support for the workpiece. When the centerless grinding machine is operated for grinding, the workpiece may be thus contacted by the grinding wheel, by the regulating wheel, and by the workpiece mount. Regularly, the grinding wheel and the regulating wheel may be arranged in a fashion parallel to one another. It may be however also envisaged to arrange the grinding wheel at a small angular offset with respect to the regulating wheel. In this way, a feed movement for the workpiece may be generated.

Frequently, the grinding wheel comprises a greater diameter than the regulating wheel. The grinding wheel and the regulating wheel are generally provided with drives and/or may be coupled with drives. Generally, the grinding wheel and the regulating wheel are driven in the same direction of rotation, wherein, however, the respective drives are controlled in such a way that a circumferential velocity of the grinding wheel deviates from a circumferential velocity of the regulating wheel. As the workpiece is engaged, in the course of the grinding procedure, by the grinding wheel as well as by the regulating wheel which are generally operated at the same rotation direction, the workpiece is set in rotation due to the cooperation of the grinding wheel and the regulating wheel, wherein a direction of rotation is opposite to the direction of rotation of the grinding wheel and the regulating wheel, respectively. Due to the different circumferential velocities of the grinding wheel and the regulating wheel, a relative motion between the workpiece and the grinding wheel may be generated which may comprise slippage or spin. In this way, material may be removed from the workpiece.

When grinding at a grinding machine, particularly at a centerless cylindrical grinding machine, for instance a centerless external cylindrical grinding machine, regularly dynamic forces are generated that are based on dynamic effects. The dynamic forces may have an adverse impact on the grinding operation, particularly on the accuracy. In this way, particularly the dynamic compliancy (sometimes referred to as elastic modulus) of the grinding machine or of components thereof, may be impaired or mitigated. This may involve occurrences of dominant dynamic compliances. As a result, for instance rattling may occur. As used herein, the term compliancy may basically correspond to an opposite or even inverse of stiffness. The term compliance may be also referred to as resilience, at least in some exemplary embodiments. A reduced dynamic stiffness and/or dominant dynamic compliances may cause an increased wear of the grinding wheel and/or the regulating wheel and may cause a decreased quality of the workpiece. Particularly, the accuracy of the machining operation may be impaired. Further, particularly in case of resonance, increased stresses at components of the grinding machine may occur which may for instance have an adverse effect on bearings, guides, drives, and such like.

Measures for eliminating dynamic weak spots, particularly for preventing excessive dynamic compliances are generally known in the art. This may, on the one hand, for instance involve a general structural design of the grinding machine. It may be further envisaged to adjust grinding parameters to eliminate and/or exclude adverse dynamic effects. Grinding parameters may involve grinding materials, geometries of the grinding wheel and/or the regulating wheel, driving parameters (speed of rotation and/or circumferential velocity of the grinding wheel and/or the regulating wheel), infeed forces and such like. Structural design changes of the grinding machine and/or a corresponding structural machine design of the grinding machine is for instance recommendable when the grinding machine is basically used as a single-purpose machine.

However, further applications may be envisaged which are not feasible at all or only feasible at considerably increased effort on the basis of conventional approaches to the reduction of dynamic compliancy and/or to the elimination of dynamic weak spots.

Furthermore, conventional systems for influencing and/or damping the vibratory behavior of grinding machines are known in the art. These systems may be for instance, arranged as active damping systems and/or as passive damping systems. Active damping systems generally comprise at least one actuator which may be controlled in dependency of at least one detected value that represents the vibratory behavior of the grinding machine. Hence, active damping systems are frequently only feasible at huge effort, as a corresponding control system, sensors and respective actuators need to be provided. Passive damping systems may for instance comprise mass-spring systems which are provided at the side of a frame, and which are, in accordance with an exemplary embodiment, intended to influence the damping behavior of the grinding machine in an advantageous fashion. However, experience has shown that merely on the basis of such conventional systems at least for some applications no sufficient optimization of the vibratory behavior of the grinding machine may be achieved.

In view of this, it is an object of the present disclosure to provide a damping device for a spindle of a grinding machine, which permits an efficient damping of vibrations and an efficient reduction of dynamic compliances (dynamic resiliency) of the spindle.

It is a further object to provide a damping device which is particularly suited for a grinding spindle or regulator spindle of a centerless grinding machine.

It is another object to provide a damping device which may be implemented at moderate effort. Preferably, in accordance with this aspect, the damping device is suited for upgrading grinding machines that are already in operation, particularly respective centerless grinding machines.

It is a further object to provide a damping device which may contribute to an increase of the lifetime of the grinding machine, particularly of the grinding spindle or the regulator spindle and of the corresponding spindle drives, respectively.

It is still a further object to provide a damping device which may improve the general accuracy of the grinding operation.

It is yet a further object to provide a damping device may be adapted to an actual present application and operation type at moderate effort.

It is yet an even further object to provide a damping device that provides improved broad-band damping capabilities.

It is yet still a further object to provide a spindle which is provided with a respective damping device It is yet still a further object to provide a grinding machine which comprises at least one of a grinding spindle and a regulator spindle including a corresponding damping device.

SUMMARY

In accordance with one aspect of the present disclosure, these and other objects are achieved by a damping device for a spindle of a grinding machine, particularly for a grinding spindle or regulator spindle of a centerless grinding machine, wherein the damping device comprises at least one damping unit including an auxiliary mass section, an elastic section, and a damping section, which are integrated in the spindle and which jointly form a damped vibratory system to increase the dynamic stiffness of the spindle.

In accordance with the above aspect of the present disclosure, a damping device may be provided which may be integrated in the spindle and may be therefore contribute to a reduction of vibrations and/or an increase of the dynamic stiffness of the spindle at the very spot where dynamic effects most likely may have adverse impacts. In other words, vibration compensation may be effected directly at the (driven and/or drivable) spindle. In this way, an increased process stability may be achieved. The load on the spindle in the course of the grinding procedure may be significantly reduced. This may have an advantageous impact on the lifetime of the spindle and on the lifetime of further components of the grinding machine. Machining accuracy and particularly reproducibility of the machining accuracy may be further increased. This may have positive impacts on process capabilities and similar quality parameters.

In one exemplary embodiment, such a damping device is implemented in a spindle of a centerless grinding machine. This may particularly involve a centerless external cylindrical grinding machine. The damping device may be integrated in the grinding spindle of the grinding machine. In the alternative, the damping device may be integrated in the regulator spindle of the grinding machine. It goes without saying that both the grinding spindle and the regulator spindle of the grinding machine may be fitted with a respective damping device. In some exemplary embodiments, the damped vibratory system formed by the damping device may be referred to as passive damping system. This is in clear contrast to conventional active damping systems.

According to a further embodiment, the at least one damping unit is arranged as passive auxiliary mass damping unit. In other words, in accordance with this exemplary embodiment, the damping device does not comprise active systems (sensors, actuators and such like). In this way, the damping device may be implemented at little effort. In one exemplary embodiment, the damping device and/or a spindle that is provided with the damping device may be arranged as "replacement part" and may replace an existing conventional spindle of a grinding machine. In this way, the damping device may be retrofitted at existing grinding machines at little effort. In one embodiment, the damping device may be implemented without structural design changes of an external contour or an interface shape of the grinding spindle or the regulator spindle. The elastic section may be for instance arranged as a reduced cross section. The reduction of the cross section may be for instance arranged in a fashion similar to a spring and may be therefore perform vibrations, particularly bending vibrations.

In one exemplary embodiment, the damping device is arranged as a broad-band damper, i.e. as a damper which contributes to the reduction the dynamic compliances in at least one frequency band that covers general operating frequencies. General operating frequencies may involve for instance about 100 Hz (Hertz) to about 500 Hz. In one embodiment, the operating frequencies may involve about 200 Hz to 400 Hz.

Basically, a (moderate) increase of the static compliancy, and hence, a reduction of the static stiffness of the spindle, may be accepted to increase the dynamic stiffness. Such a supposed potential drawback may be compensated or even overcompensated by the improved dynamic behavior.

An auxiliary mass damper may be conventionally perceived as a combination of at least one mass piece, an elastic element and a damping element. Accordingly, an auxiliary mass damper is basically arranged as a system that capable of performing vibrations as such. Dynamic vibrations of the grinding machine which may have an impact on the spindle, may, in turn, set the auxiliary mass damper into vibrations. In this way, a compensation of adverse dynamic effects may be achieved. Particularly, resonance effects (for instance resonance peaks) may be minimized.

According to a further exemplary embodiment of the damping device, the auxiliary mass section, the elastic section and the damping section are accommodated in a hollow profile section, particularly a tubular profile, of the spindle. In other words, the spindle may be at least sectionally arranged as a hollow body. In this way, the damping device may be integrated in the spindle without additional installation space requirements. Even when a reduction of the cross-sectional surface at the hollow profile section, as compared with a full section, may result therefrom, which may basically involve an increased static compliancy, the accommodation in the hollow profile section may be recommendable for reducing the dynamic compliancy.

In other words, at least a section of the spindle may be arranged in a cartridge-like fashion, and may encircle and/or delimit the damping device. For instance, the hollow profile section may encircle the damping device in a sleeve-like fashion. In this way, the damping device is protected from external environmental influences. The damping device may be integrated in the spindle in a fashion "invisible" from the exterior. In one exemplary embodiment, the hollow profile section is arranged as a tubular profile. In one exemplary embodiment, the tubular profile is arranged as a rotationally symmetric or an essentially rotationally symmetric tubular profile. The hollow profile section may be at least sectionally provided with a shell surface or a cover surface which may serve as a seat for a grinding wheel or regulating wheel of the grinding machine. In one exemplary embodiment, the shell surface or cover surface is arranged as a rotationally symmetric shell surface or cover surface. The shell surface or cover surface may be for instance arranged as a conical surface or a cylindrical surface. In the alternative, the shell surface or cover surface of the hollow profile section may be provided with structural design elements for rotational entrainment. Accordingly, the hollow profile section may for instance involve a section or cross-section that is not rotationally symmetric. Further structural design elements for rotational entrainment may be envisaged, for instance, polygonal profiles, spline shaft profiles, and such like.

According to a further exemplary embodiment, the damping section comprises at least one cavity which is fillable with a damping fluid, particularly a viscous damping fluid. In one exemplary embodiment, the cavity is provided by the hollow profile section. In another exemplary embodiment, a damping fluid in the damping section may influence the self-damping of the damping device in a beneficial fashion. Basically, the damping fluid may be arranged to relieve dynamic energy, for instance by heat exposition. In a further exemplary embodiment, the damping fluid is a viscous liquid, particularly oil, for instance a silicone oil.

According to a further exemplary embodiment, the damping behavior of the damping device may be influenced by selecting a viscosity of the damping fluid. In accordance with the selection of a great or low viscosity, for instance an adaption of the damping behavior to low-frequency vibrations or high-frequency vibrations may be effected.

It goes without saying that basically also the auxiliary mass section and/or the elastic section may at least partially contribute to the self-damping of the damping device. The damping effect may be for instance caused by inertia and/or by internal friction.

According to a further exemplary embodiment of the damping device, the damping fluid is a silicone oil, for instance a silicone oil comprising a kinematic viscosity in the range of about 50 $mm^2/s$ to about 1000 $mm^2/s$. In a further exemplary embodiment, the kinematic viscosity of the silicone oil is in the range of about 50 $mm^2/s$ to about 200 $mm^2/s$. In yet another exemplary embodiment, the kinematic viscosity of the silicone oil is about 100 $mm^2/s$. Silicone oils may be generally also referred to as diorganopolysiloxane. Generally, silicone oils comprise a considerable thermal stability. Generally, silicone oils are not prone to frothing and/or the formation of suds.

According to a further exemplary embodiment, the damping device further comprises at least one compensation element which is configured for compensating pressure variations or volume variations of the damping fluid in the at least one cavity. In one exemplary embodiment, the at least one compensation element is formed from an elastomer material. In another exemplary embodiment, the at least one compensation element may be formed from a fluoro-elastomer. In one exemplary embodiment, the at least one compensation element is formed from a foam rubber or cellular rubber material. In a further embodiment, fluoro cellular rubber is utilized for the production of the at least one compensation element.

This may have the effect that variations of the damping fluid may be compensated by the compensation element. In one exemplary embodiment, the compensation element is a compressible compensation element. In a further embodiment, the compensation element comprises a smooth closed external skin. This may be the case with some cellular rubber materials. Cellular rubber materials may be generally also referred to as foamed elastomers. Variations of the damping fluid and/or variations of the fill level of the damping fluid may be particularly caused by temperature variations. An increase of temperature of the damping fluid may be for instance caused when the spindle that is provided with the damping device is in operation, when a conversion of kinetic energy and/or vibration energy to thermal energy is performed via the damping fluid. The at least one compensation element may contribute to a merely limited effect of such variations to the damping behavior of the damping device. In a further embodiment, the at least one compensation element is produced from a fluoro cellular rubber material. Fluoro cellular rubber materials comprise a remarkable thermal stability or temperature stability. Further, a considerable aging stability is provided. In accordance with an exemplary embodiment, the at least a compensation element comprises a low shore-hardness degree. Generally, in accordance with a further exemplary embodiment, the at least one compensation element may be compressed and/or expanded in response to variations, particularly pressure variations or volume variations, of the damping fluid.

In accordance with another exemplary embodiment, the damping device comprises a first damping unit which is assigned to a first spindle section, and a second damping unit which is assigned to a second spindle section, wherein the first damping unit and the second damping unit are axially displaced from one another and facing each other.

In this way may, the damping device may for instance comprise at least two auxiliary mass sections and at least two elastic sections which enable an even further targeted adaption of the damping behavior. Particularly, based on two damping units, a broad-band damping behavior may be achieved.

According to a further exemplary embodiment, the first damping unit and the second damping unit comprise a common damping section which comprises at least one cavity with is fillable with a damping fluid. In this way, structural design effort for providing the damping device may be reduced, as not necessarily each damping unit requires a separate (spatially separated) damping section.

In regard of the spindle, in accordance with another aspect of the present disclosure, these and other objects are achieved by a spindle for a grinding machine, particularly a grinding spindle and/or regulator spindle for a centerless grinding machine, wherein the spindle is drivable about its longitudinal axis in a rotating fashion, the spindle comprising an integrated damping device in accordance with any of the exemplary embodiments disclosed herein.

In one exemplary embodiment, the spindle may be qualified as a replacement part for conventional spindles. In this way, existing grinding machines may be upgraded at reasonable costs. The damping device may be entirely integrated in the spindle (which is drivable in a rotating fashion). It is not necessarily required to provide separate actuators or sensors, as the integrated damping device is basically arranged as passive damping device.

According to a further exemplary embodiment, the spindle comprises a first neck and a second neck, which define ends of the spindle that are facing away from one another, wherein the necks are connected to one another via a hollow profile section, particularly a tubular profile, and wherein the damping device is accommodated in the hollow profile section between the first neck and the second neck.

In other words, the first neck and the second neck may be connected to one another via the hollow profile section in a basically torsionally rigid fashion. To this end, the first neck and the second neck may respectively comprise a flange or collar which contacts corresponding axial ends of the hollow profile section that are facing away from one another.

In a view from the exterior, the spindle thus may be arranged in a basically three-part fashion. A first part is basically defined by the first neck. A second part is basically defined by the second neck. Between the first part and the second part a third part may extend which is (from the exterior) basically defined by the hollow profile section. In another exemplary embodiment, a support for a grinding wheel or regulating wheel is formed at the hollow profile section.

The first neck and the second neck may be arranged as a bearing neck. Accordingly, the first and the second neck may be combined with respective bearings for the spindle to receive the spindle rotatably at the grinding machine. At least one of the necks, for instance the first neck, may be further arranged as a driving neck. The neck which is arranged as a driving neck may be coupled with a spindle drive for the spindle. In this way may, particularly a rotating movement may be transferred to the spindle to set the spindle in rotation.

According to a further exemplary embodiment of the spindle, the first neck is associated with a first spindle section and the second neck is associated with a second spindle section, wherein the first spindle section and the second spindle section are mediately connected to one another via the hollow profile section, wherein at least the first spindle section and the second spindle section are provided with an auxiliary mass section of a damping unit of the damping device, and wherein the auxiliary mass section is surrounded by the hollow profile section.

In other words, the first neck and the second neck may respectively transition into an auxiliary mass section at their ends that are facing each other. The first auxiliary mass section and the second auxiliary mass section may face one another. The first auxiliary mass section and the second auxiliary mass section may define there-between an axial gap which is surrounded by the hollow profile section. The spindle may be arranged as a constructed or assembled spindle.

According to a further exemplary embodiment of the spindle, the respective auxiliary mass section is integrally formed with the neck of the corresponding spindle section, wherein the respective elastic section is formed by a material weakening of the spindle section which is arranged between the auxiliary mass section and the neck, and wherein the elastic section is surrounded by the hollow profile section.

By way of example, the material weakening may be formed by a necking or a groove in the respective spindle section. The material weakening may be also referred to as bar. The material weakening may be also referred to as cross-sectional reduction. The material weakening increases the elastic behavior of the elastic section. An (axial) cross section and an axial extension of the respective material weakening may influence the elasticity of the first elastic section and/or the second elastic section. Provided that the elastic section of the respective spindle section is basically arranged in a rotationally symmetric fashion, for instance in a cylindrical fashion, the damping behavior of the damping device may be adapted and/or tuned by selecting the respective diameter. Particularly, in accordance with a further exemplary embodiment, the first elastic section comprises a first diameter and the second elastic section comprises a second diameter which are different from one another. Different elasticity resulting therefrom may have a beneficial effect on broad-band capability of the damping behavior.

In accordance with a further embodiment, in total, each spindle section may comprise along its axial extension a neck, a flange or collar, an elastic section and an auxiliary mass section. In accordance with a further exemplary embodiment, each spindle section is arranged as a basically rotationally symmetric unit.

In accordance with a further exemplary embodiment, basically also further embodiments of the spindle may be envisaged, wherein merely a single spindle section (of both spindle sections) is provided with a respective damping unit. In other words, this may involve, in accordance with this embodiment, that only one spindle section comprises an elastic section and an auxiliary mass section. In this way, for some exemplary applications, a beneficial damping behavior may be achieved.

According to a further embodiment, the first spindle section comprises a first auxiliary mass section and the second spindle section comprises a second auxiliary mass section, wherein the first auxiliary mass section is defined by a first material weakening and the first spindle section which forms a first elastic section, wherein the second auxiliary mass section is defined by a second material weakening in the second spindle section which forms a second elastic section, wherein the first auxiliary mass section and the first material weakening are associated with a first damping unit, wherein the second auxiliary mass section and the second material weakening are associated with a second damping unit, and wherein the first auxiliary mass section and the second auxiliary mass section are facing one another and are commonly surrounded by the hollow profile section.

In this way, the auxiliary mass sections and the elastic sections may be arranged as integrally shaped portions of the spindle sections. Required effort for producing the spindle that is provided with the damping device may be further reduced.

According to a further exemplary embodiment of the spindle, the damping section is arranged as a cavity for receiving a damping fluid, wherein the cavity is delimited by the at least one auxiliary mass section and the hollow profile section. In another exemplary embodiment, an interior space that is formed by the hollow profile section which is not occupied by the at least one auxiliary mass section and the at least one elastic section may be regarded as a cavity for the formation of the damping section. The remaining cavity in the hollow profile section resulting therefrom may be filled with the damping fluid. The damping fluid may damp self-movements and/or relative movements of the elements that are arranged in the hollow profile section. The damping section may be generally referred to as damping gap.

In one exemplary embodiment, the hollow profile section comprises at least one inlet opening for the damping fluid which may be closed in a sealed fashion. This may involve for instance a plug or a similar sealable opening.

In a further exemplary embodiment, at least one auxiliary mass section comprises a support for receiving the compensation element for the damping fluid. In this way, also the compensation element may be accommodated in the interior space which is defined by the hollow profile section.

According to a further exemplary embodiment, the first elastic section is formed by a first groove comprising a first diameter, wherein the second elastic section is formed by a second groove comprising a second diameter, wherein the first diameter and the second diameter are different from one another. In this way, the damping behavior may be optimized.

In regard of the grinding machine, in accordance with another aspect of the present disclosure, the above and further objects of the present disclosure are achieved by a grinding machine, particularly a centerless grinding machine, comprising a machine bed, a grinding spindle which may be coupled to a spindle drive, and which is arranged to receive a grinding wheel, a regulator spindle which may be coupled to a spindle drive, and which is arranged for receiving a regulating wheel, a workpiece mount for receiving a to-be-machined workpiece between the grinding spindle and the regulator spindle, wherein the grinding spindle and the regulator spindle are received at the machine bed and are movable with respect to one another, and wherein at least the grinding spindle or the regulator spindle is arranged as a spindle comprising an integrated damping device in accordance with any of the exemplary embodiments disclosed herein.

It goes without saying that features of the present disclosure that have been mentioned herein before and will be described hereinafter may be used not only in the respectively specified combination, but also in other combinations or in isolation without departing from the scope of the present disclosure.

BRIEF DESCRIPTION OF THE DRAWINGS

Further features and exemplary embodiments of the present disclosure are disclosed in the following description of a plurality of exemplary embodiments, with reference to the drawings, wherein.

DETAILED DESCRIPTION OF EXEMPLARY EMBODIMENTS

Figure 1:
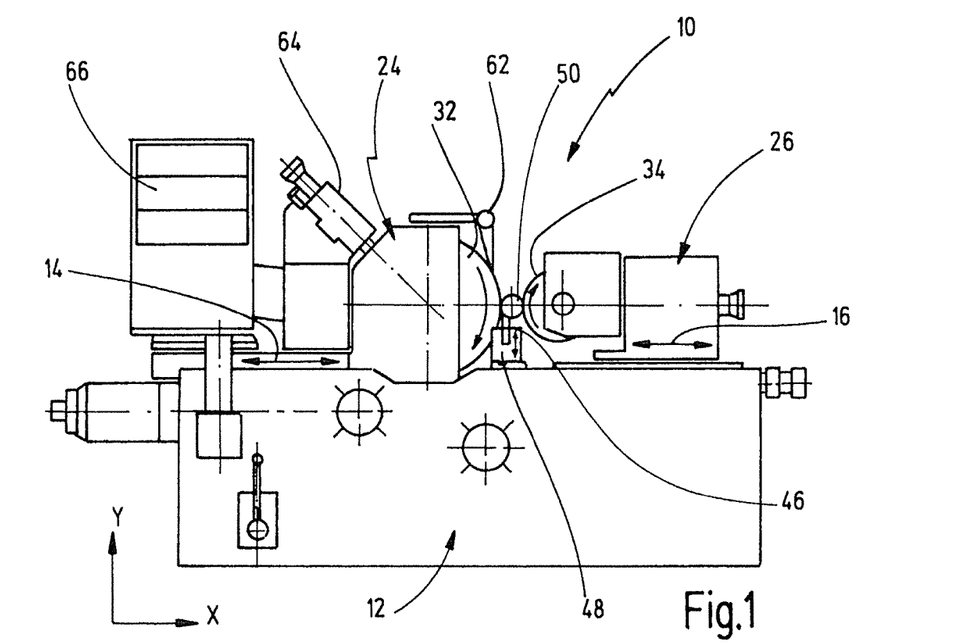
FIG. 1 is a schematic frontal view of a grinding machine which is arranged as a centerless grinding machine.

FIG. 1 illustrates a frontal view of a grinding machine which is designated by reference numeral 10. With reference to FIG. 1 and with further reference to FIG. 2 which shows a schematic, greatly simplified partial view of a grinding machine 10 in top view, a basic structure and basic components of the grinding machine 10 will be described in the following.

Figure 2:
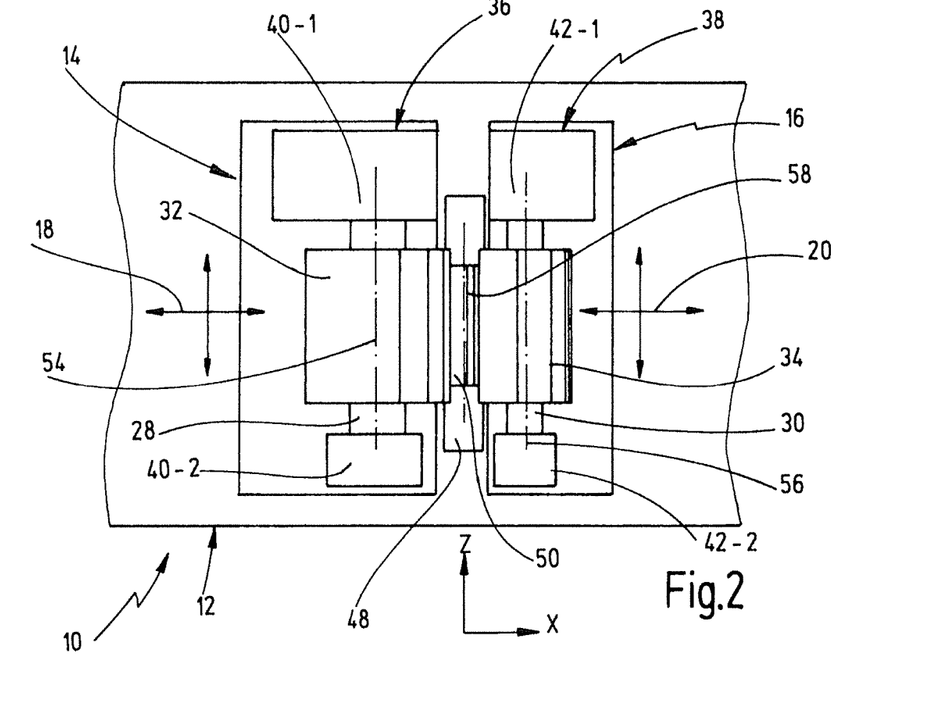
FIG. 2 is a greatly simplified schematic partial view of a centerless grinding machine in top view.

The grinding machine 10 may be particularly arranged as a so-called centerless grinding machine 10. By way of example, the grinding machines which are illustrated by means of FIGS. 1 and 2 are arranged as centerless external cylindrical grinding machines. The grinding machine 10 comprises a machine bed 12 which may be also referred to as frame. At the machine bed 12, saddle slideways 14, 16 may be received which enable displacement movements of components of the grinding machine 10.

A coordinate system X-Y-Z may be inferred from FIGS. 1 and 2 which may be utilized to designate main directions and main axes, respectively, of the grinding machine 10. Regularly, an axis that for instance coincides with a longitudinal axis of a workpiece which is received at the grinding machine 10, or which is at least substantially parallel to this axis is regularly designated by Z. The axis Z is further oriented in substantially parallel fashion to at least one spindle axis of the grinding machine 10. An axis which may for instance serve as an infeed axis is regularly designated by X. Generally, the axis X is oriented in a perpendicular fashion with respect to the axis Z. Generally, the axis X is referred to as working axis. An axis Y generally designates a height extension. The axis Y is typically arranged in perpendicular fashion to the axis X and in perpendicular fashion to the axis Z.

The saddle slideways 14, 16 may be arranged as translational guides and may particularly enable infeed movements along the X-axis. The saddle slideways 14, 16 may be however also arranged as cross table saddle slideways. Accordingly, the saddle slideways 14, 16 may enable, in addition to the movement along the X-axis, also a movement along the Z-axis. The Z-axis may be also referred to as feed axis. Movement directions which may be envisaged and which are enabled by the saddle slideway 14, 16 are indicated in FIG. 2 by arrows designated by 18, 20.

The grinding machine 10 may further comprise a grinding headstock 24 and a regulating wheel headstock 26. At the grinding headstock 24, a grinding spindle 28 may be received in a rotatable fashion. At the regulating wheel headstock 26, a regulator spindle 30 may be received in a rotatable fashion. The grinding spindle 28 may be configured for carrying at least one grinding wheel 32. The regulator spindle 30 may be configured for carrying at least one regulating wheel 34. The grinding headstock 24 may be further provided with a grinding wheel drive 36, or at least coupled with a respective grinding wheel drive 36. The regulating wheel headstock 26 may be provided with a regulating wheel drive 38, or at least coupled with a regulating wheel drive 38. The saddle slideway 14 is associated to the grinding headstock 24. The saddle slideway 16 is associated to the regulating wheel headstock 26. The saddle slideways 14, 16 may be coupled with suitable drives to enable translational movements of the grinding headstock 24 and/or the regulating wheel headstock 26 in a X-Z plane, refer to the arrows designated by 18, 20 in FIG. 2.

The grinding wheel drive 36 may comprise at least one motor, particularly an electromotor. The regulating wheel drive 38 may comprise at least one motor, particularly an electromotor. The grinding wheel drive 36 may be coupled with the grinding spindle 28 in a direct or mediate fashion. A mediate coupling may be for instance achieved by a gear, a clutch and similar elements. The regulating wheel drive 38 may be coupled to the regulator spindle 30 in a direct or mediate fashion. A mediate coupling may be achieved by a gear, a clutch or similar elements interposed therebetween.

The grinding spindle 28 may comprise at least one bearing 40. In another exemplary embodiment, two bearing locations 40-1, 40-2 between which the grinding wheel 32 is arranged, refer to FIG. 2. The regulator spindle 30 may comprise at least one bearing 42, preferably a first bearing location 42-1 and a second bearing location 42-2. Between the bearing locations 42-1, 42-2, the at least one regulating wheel 34 may be arranged, refer also particularly to FIG. 2.

Between the grinding spindle 28 and the regulator spindle 30, a workpiece mount 46 is arranged which is received at a workpiece mount support 48. The workpiece mount 46 is configured for receiving and/or supporting a workpiece 50 which may be received between the grinding spindle 28 and the regulator spindle 30 for grinding machining. The workpiece mount 46 may be also referred to as support ruler.

The grinding spindle 28 including the grinding wheel 42 which is attached thereto is rotatable and/or drivable in a rotary fashion about a longitudinal axis 54. The regulator spindle 30 including the regulating wheel 34 which is attached thereto is rotatable and/or drivable in a rotary fashion about a longitudinal axis 56. The grinding spindle 28 and the regulator spindle 30 may cooperate in such a way that the workpiece 50 which is received therebetween may be set in rotation about its longitudinal axis 58 by the grinding wheel 32 and the regulating wheel 34. In other words, the workpiece 50 may be driven by the grinding wheel 32 and the regulating wheel 34 in a mediate fashion. As may be inferred from FIGS. 1 and 2 in conjunction, the axes 54, 56 and 58 may be arranged in a common X-Z plane. Particularly, the axes 54, 56, 58 may be arranged to one another in a parallel fashion. As already mentioned herein before, it may be also envisaged that at least the regulator spindle 30 and/or the longitudinal axis 56 thereof may be at least slightly inclined with respect to the longitudinal axis 54 of the grinding spindle 28, and/or may be offset thereto in an angular fashion. Such an inclination may cause a feed motion of the workpiece 50. This may be applicable particularly for so-called through feed grinding operations. In this way, particularly a feed motion of the workpiece may be provided. It goes without saying that a feed motion of the workpiece 50 may be also achieved in a different way. Generally, the grinding machine 10 may be also configured for performing groove grinding or plunge grinding operations. It further goes without saying that also the workpiece mount 46 and/or the workpiece mount support 48 may be provided with a respective drive.

Based on the view of FIG. 1, it is further apparent that the grinding wheel 32 and the regulating wheel 34 may be basically drivable in a rotatory fashion in the same direction of rotation. Generally, a rotatory drive of the grinding wheel 32 and the regulating wheel 34 is effected in such a way that different circumferential velocities may be present at the same. A resulting circumferential velocity difference may effect an entrainment of the workpiece 50 by the grinding wheel 32 and the regulating wheel 34 which comprises slippage or spin. Basically, the workpiece 50 is set in rotation by the grinding wheel 32 and the regulating wheel 34, the direction of rotation of which is opposite is to the direction of rotation of the grinding wheel 32 and of the regulating wheel 34. Based on the different levels of circumferential velocities of the grinding wheel 32 and the regulating wheel 34, basically no "ideal" slippage-free or spin-free entrainment may be effected. Rather, between the workpiece 50 and the grinding wheel 32, a relative movement, particularly a sliding relative movement, may be effected. This relative movement basically causes the material removal at the workpiece 50.

By appropriately controlling carriage drives (not separately shown in FIGS. 1 and 2) of at least one of the grinding headstock 24 and the regulating wheel headstock 26, further an infeed force and/or pressing-on force in the X-direction to the workpiece 50 may be defined and generated. In other words, the workpiece 50 may be clamped between the grinding wheel 32 and the regulating wheel 34, particularly clamped in a biased state. It has been seen that during operation of the grinding machine 10, dynamic compliances of the grinding spindle 28 and/or the regulator spindle 30 may occur. These dynamic compliances, in combination with the pressing-on force, may have an adverse effect on the machining accuracy. Further, involved dynamic effects may lead to a premature wear of the grinding wheel 32 or the regulating wheel 34. Further, an increased load on the bearings 40, 42 may be involved. In another exemplary embodiment, at least the grinding spindle 28 or the regulator spindle 30 is provided with damping action (or damping capability), particularly with a damping device, to enable an increased dynamic stiffness.

By way of example, the grinding machine 10 may further comprise a feed 62 for a coolant and lubricant cutting fluid (abbreviation: KSS-feed). Further, particularly the grinding headstock 24 may be associated with a dressing device 64 for dressing the grinding wheel 32. The grinding machine 10 may be provided with a control device 66 by means of which an operator may operate and run the grinding machine 10. It goes without saying that the control device 66 may be also arranged for an automatic control of the grinding machine 10.

Figure 3:
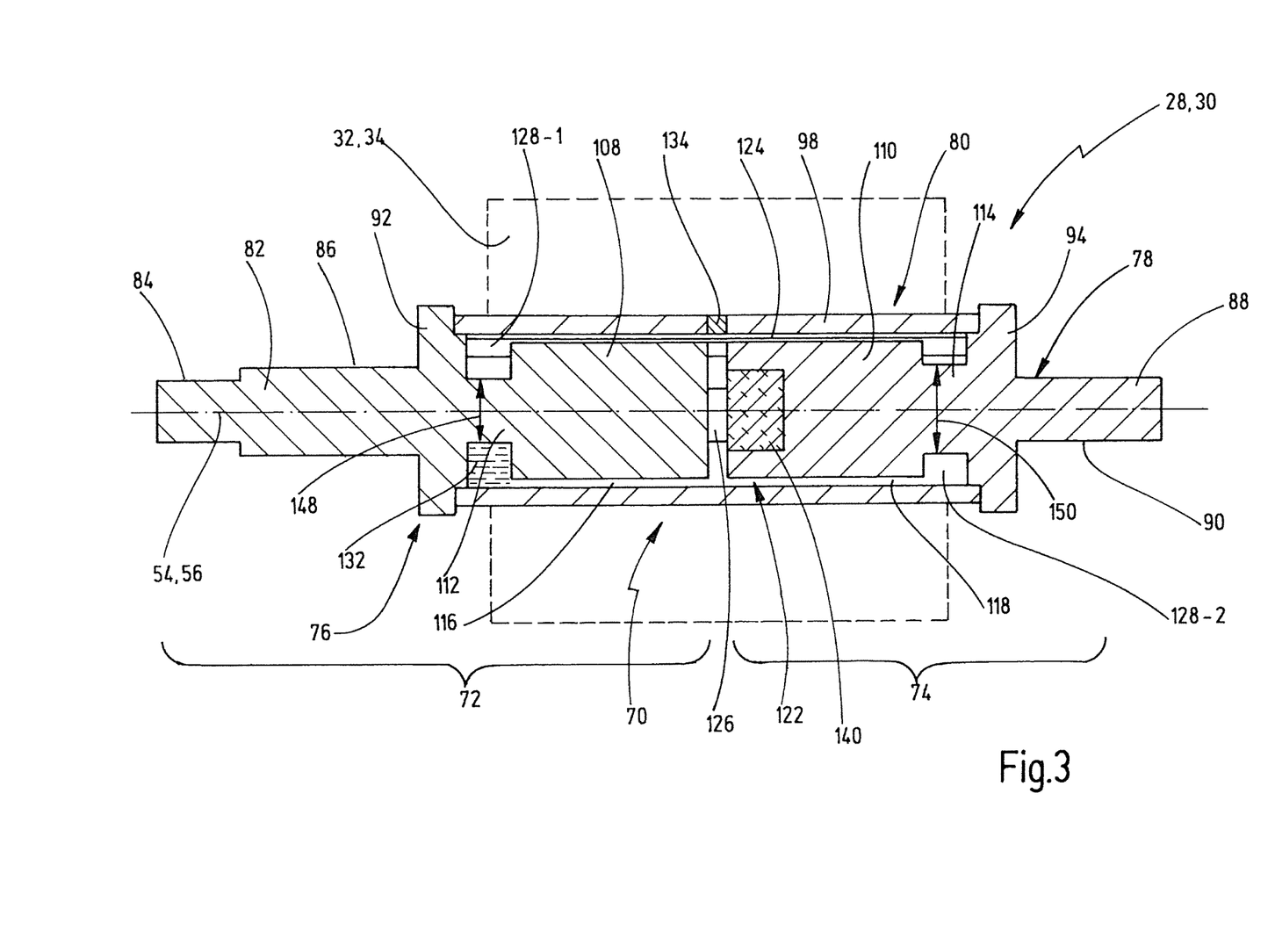
FIG. 3 shows a longitudinal cross section of a spindle of a grinding machine, particularly a grinding spindle or a regulator spindle which is provided with a damping device.
Figure 4:
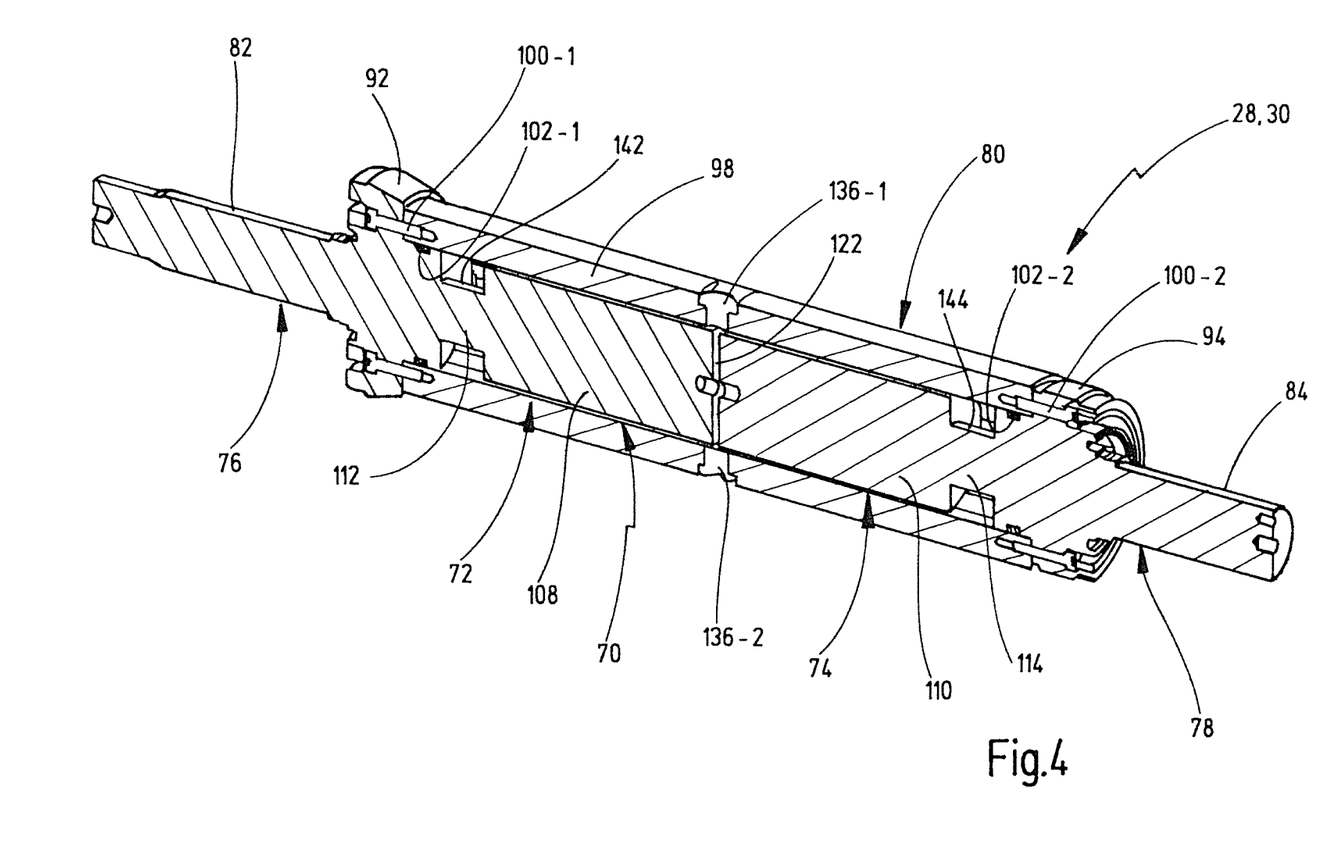
FIG. 4 shows a perspective view of a longitudinal cross section of a further embodiment of a spindle including a damping device, particularly a grinding spindle or a regulator spindle.

In the following, an exemplary implementation of a spindle will be illustrated with reference to FIG. 3 and to FIG. 4, which spindle may be basically used as grinding spindle 28 or as regulator spindle 30 and which may be provided with a damping device 70 for reducing undesired dynamic compliances. FIG. 3 illustrates a longitudinal cross section through a spindle which may be utilized as a grinding spindle 28 or a regulator spindle 30 (in the following uniformly referred to as spindle 28, 30). FIG. 4 illustrates a perspective cross-sectional view of a spindle 28, 30 in a longitudinal cross section which is basically arranged in a similar fashion.

In accordance with an exemplary embodiment, the spindle 28, 30 is provided with a damping device 70 which comprises at least one damping unit 72, 74. Particularly, the damping device 70 may comprise a first damping unit 72 and a second damping unit 74. The first damping unit 72 may be associated to a first spindle section 76. The second damping unit 74 may be associated to a second spindle section 78. Between the spindle sections 76, 78, a hollow profile section 80 may extend. The spindle sections 76, 78 may be connected to one another via the hollow profile section 80. It is particularly preferred that no direct, immediate connection (in a mechanical fashion) is present between the spindle sections 76, 78. In accordance with an exemplary embodiment, the mechanical/structural connection between the first spindle section 76 and the second spindle section 78 is achieved via the hollow profile section 80 which extends therebetween.

The first spindle section 76 may comprise a neck 82. The neck 82 may comprise a bearing piece 84 and an entrainment section 86. At the bearing piece 84, the first neck 82 may be received, refer to the bearings 40, 42 in FIG. 2. At the entrainment section 86, the neck 82 may be driven in a rotatory fashion about its longitudinal axis 54, 56. In this way, the spindle 28, 30 may be set into rotation about its longitudinal axis 54, 56. The second spindle section 78 comprises a neck 88 which may comprise a bearing piece 90. The neck 88 may be coupled with a bearing 40, 42 via the bearing piece 90, refer to FIG. 2. Each of the both spindle sections 76, 78 may provide a bearing location for the spindle 28, 30 so that the same may be received at both ends thereof.

The first spindle section 76 further comprises a flange or collar 92 which is connected to the neck 82. The second spindle section 78 is in a similar fashion provided with a flange or collar 94 which is connected to the neck 88. Particularly, the spindle sections 76, 78 may be coupled with the hollow profile section 80 via the collars 92, 94. By way of example, the hollow profile section 80 is arranged as a tubular profile 98, refer also to FIG. 4. The tubular profile 98 is, at respective front sides, coupled to the first spindle section 76 and the second spindle section 78, respectively. To this end, the respective collar 92, 94 may contact a front face of the tubular profile 98 which is facing the collar 92, 94.

For fixing the spindle sections 76, 78 with the hollow profile section 80 and/or the tubular profile 98, mounting elements 100 may be provided which may for instance enable a force-fit mounting. By way of example, mounting elements 100-1, 100-2 are indicated in FIG. 4 which take the form of screws. It may be basically also envisaged to bond the spindle sections 76, 78 to the hollow profile section 80. A bonded connection may for instance involve welding, soldering, gluing or combinations thereof. It may be also envisaged to secure the composition of the spindle sections 76, 78 and the hollow profile section 80 in a bonding fashion and a force-fit fashion. To this end, the connection may be effected via the mounting elements 100 and an adhesive layer or a gluing layer.

In accordance with another exemplary embodiment, the connection of the spindle sections 76, 78 to the hollow profile section 80 is effected in a sealed fashion. It is in other words desirable that the spindle sections 76, 78 and/or their collars 92, 94 are received at the hollow profile section 80 in a sealed, particularly a fluid-prove sealed fashion. To this end, gaskets or sealing rings 102 may be provided which may be for instance received at the spindle sections 76, 78 or at the hollow profile section 80. In FIG. 4, corresponding sealing rings 102-1, 102-2 are indicated which are received at the spindle sections 76, 78 and which may be inserted in the hollow profile section 80 to seal the connection between the hollow profile section 80 and the spindle sections 76, 78. The sealing rings 102-1, 102-2 may be arranged as radially effective sealing rings. It may be however also envisaged to utilize axially effective sealing rings, and to couple the same particularly to front faces of the hollow profile section 80 and the collars 92, 94 of the spindle sections 76, 78 that are facing each other.

As already indicated above, the spindle 28, 30 comprises a damping device 70 including at least one damping unit 72, 74. This means in other words, embodiments may be envisaged in which only one spindle section 76, 78 is assigned with a damping unit 72, 74. Nevertheless, at least in some exemplary embodiments, each of both spindle sections 76, 78 may be coupled and/or provided with a respective damping unit 72, 74. Each damping unit 72, 74 may comprise an auxiliary mass section 108, 110, an elastic section 112, 114, and a damping section 116, 118. By way of example, the first damping unit 72 may comprise a first auxiliary mass section 108, a first elastic section 112, and a first damping section 116. Similarly, the second damping unit 74 may comprise a second auxiliary mass section 110, a second elastic section 114, and a second damping section 118.

The at least one damping section 116, 118 may be basically formed by a cavity 122 which is present between the hollow profile section 80 and the elements of the spindle sections 76, 78 that are accommodated therein. The cavity 122 may be therefore formed for instance by a circumferential gap 122 between an interior wall o the hollow profile section 80 and an exterior circumference of the at least one auxiliary mass sections 108, 110. Further, the cavity 122 may comprise an axial gap 126 which may be present between front-sided frontal surfaces of the auxiliary mass sections 108, 110. Further, the cavity 122 may comprise at least one annular groove 128 which may encircle the at least one elastic section 112, 114. It may be further inferred from the embodiment in accordance with FIG. 3 that a first annular groove 128-1 may be associated to a first elastic section 112, and a second annular groove 128-2 may be associated to a second elastic section 114. The circumferential gap 124, the axial gap 126, and the at least one annular gap groove may define the cavity 122.

In the cavity 122, the at least one damping section 116, 118 may be formed. In one exemplary embodiment, the at least one damping section 116, 118 is filled with a damping fluid 132 (in FIG. 3 merely sectionally indicated). In another exemplary embodiment, the cavity 122 that forms the at least one damping section 116, 118 is entirely or nearly entirely filled with the damping fluid 132. The damping fluid 132 may be arranged as a silicone oil, for instance. Nevertheless, other damping fluids may be envisaged. In another exemplary embodiment, the damping fluid comprises a kinematic viscosity which is adapted to the desired damping behavior of the damping device 70. With the examples illustrated in accordance with FIGS. 3 and 4, for instance a damping fluid in the form of silicone oil may be utilized which comprises a kinematic viscosity of about 100 mm$^2$/s.

The at least one auxiliary mass section 108, 110, the at least one elastic section 112, 114 and the at least one damping section 116, 118 (which is filled with the damping fluid 132) may jointly form a damped vibratory system. The damping fluid 132 in the damping section 116, 118 is assigned with the task to dissipate kinetic energy and/or vibratory energy from the system. This may be for instance effected by a transformation into thermal energy.

The cavity 122 may be fillable through at least one opening 134 in the hollow profile section 80, refer to FIG. 3. The at least one opening 134 may be closable by means of at least one closing element 136, refer to a first closing element 136-1 and a second closing element 136-2 in FIG. 4. The at least one closing element 136 may be for instance arranged as a plug or a closing screw. In accordance with another exemplary embodiment, the cavity 122 is sealingly closable (i.e. can be closed in a sealed fashion). Particularly, in accordance with another exemplary embodiment, the cavity 122 may be closed (or closable) in a fluid-prove sealed or gas-prove sealed fashion. In this way, it is ensured that the damping fluid 132 cannot escape from the cavity 122. It is also ensured that no considerable pressure compensation with the environment takes place when the pressure of the damping fluid 132 increases.

In accordance with another exemplary embodiment, variations of the fill level and/or pressure variations of the damping fluid 132 are compensated by means of a compensation element 140 which may be accommodated in the hollow profile section 80 as well as the damping units 72, 74. For instance, in FIG. 3, the compensation element 140 is provided at an axial front face of the auxiliary mass section 110. It may be envisaged to receive a respective compensation element 140 in both the first auxiliary mass section 108 and the second auxiliary mass section 110, for instance in axial front faces thereof that are facing one another. Other embodiments and arrangements of the compensation element 140 within the hollow profile section 80 may be envisaged. In another exemplary embodiment, the compensation element 140 is sufficiently elastic, particularly sufficiently compressible. By way of example, the compensation element 140 may be arranged to be deformed upon a pressure increase or volume increase of the damping fluid 132 in the cavity 122, particularly arranged to become compressed, to provide sufficient space for the expanding damping fluid 132. In this way, an excessive pressure increase of the damping fluid 132 in the cavity 122 may be avoided. This may be applicable for instance in case of a temperature rise in the at least one damping section 116, 118 which is formed by the cavity 122.

In another exemplary embodiment, the at least one compensation element 140 is formed from an elastomer material. Particularly, cellular rubber materials or cellular rubber-like materials may be suited. In accordance with another exemplary embodiment, the at least one compensation element 140 is a fluoro cellular rubber based on a fluoro-elastomer.

The at least one auxiliary mass section 108, 110 may be arranged as a mass piece which is arranged in a basically cylindrical fashion, and which basically extends along the longitudinal axis 54, 56. The at least one mass piece 108, 110 may be connected to the respective spindle section 76, 78 via the at least one elastic section 112, 114. The at least one elastic section 112, 114 may be formed by a material weakening 142, 144 in the respective spindle section 76, 78. By weakening the material in the elastic sections 112, 114, compliancy of the spindle sections 76, 78 may be increased. In this way, the vibratory capability of the auxiliary mass sections 108, 110 may be increased. Vibrations of the auxiliary mass sections 108, 110 may comprise different vibration modes. For instance, torsional vibrations about the longitudinal axis 54, 56 may be envisaged. Similarly, bending vibrations may be envisaged, wherein the at least one auxiliary mass section 108, 110 may assume slightly inclined orientations with respect to the longitudinal axis 54, 56. Deflections may be performed along the X-axis and along the Y-axis. Regularly, however, complex vibration modes may be present which may for instance represent combinations of longitudinal vibrations, torsional vibrations and/or bending vibrations.

The damping behavior of the damping device 70 may be influenced in a desired fashion by an appropriate adjustment of the at least one auxiliary mass section 108, 110, the at least one elastic section 112, 114 and the at least one damping section 116, 118—particularly of the filling thereof with the damping fluid 132. The mass of the at least one auxiliary mass section 108, 110 may be basically influenced by the external shape thereof. The elasticity of the at least one elastic section 112, 114 may be influenced by the axial extension thereof and by varying the cross section 142, 144 thereof that remains after the material weakening. By way of example, after processing the material weakening 142, 144 at the first elastic section 112, a first diameter 148 may remain. By way of example, after the material weakening 144 of the second elastic section 114, a second diameter 150 may remain, refer to FIG. 3.

The diameters 148, 150 may be adjusted to one another in an appropriate fashion to influence the damping characteristics of the damping device 70 in a favorable fashion. By way of example, in the exemplary embodiment elucidated with reference to FIGS. 3 and 4, the first elastic section 112 may comprise a first diameter 148 of about 35 mm. Further, the second elastic section 114 may comprise a second diameter 150 of about 40 mm. The diameters 148, 150 may be generally also referred to as adjustment diameters. A shaping of the elastic sections 112, 114 with different adjustment diameters may have a positive effect on the desired broad-band capability of the damping action.

It goes without saying that the spindle sections 76, 78 and the hollow profile section 80 may be basically manufactured from customary materials, particularly from customary steel materials which may be basically also utilized for the production of spindles of a conventional shape. In the FIGS. 3 and 4, the spindle sections 76, 78 are shown as integrally shaped or as basically integrally shaped components which integrate at least the auxiliary mass section 108, 110 and the elastic section 112, 114 therein. In this way, for instance, the assembly of the spindle 28, 30 may be simplified. However, it may be also envisaged that the spindle sections 76, 78 may be arranged as "assembled" spindle sections in the alternative. It may be for instance envisaged to provide at least the respective auxiliary mass section 108, 110 or the respective elastic section 112, 114 as a separate component and to assemble the same with the spindle section 76, 78 in an appropriate fashion to a compound structure.

With reference to FIGS. 5 to 9, in the following, functional examples of the arrangement of spindles with damping devices which are arranged in accordance with at least some aspects of the present disclosure will be elucidated. FIGS. 5 to 9 at least partially make reference to exemplary regulator spindles which are provided with a damping device in accordance with the exemplary embodiment elucidated with reference to FIGS. 3 and 4. As a reference, particularly a regulator spindle of a conventional type is utilized which comprises similar dimensions and/or is provided with a similar regulating wheel.

Figure 5:
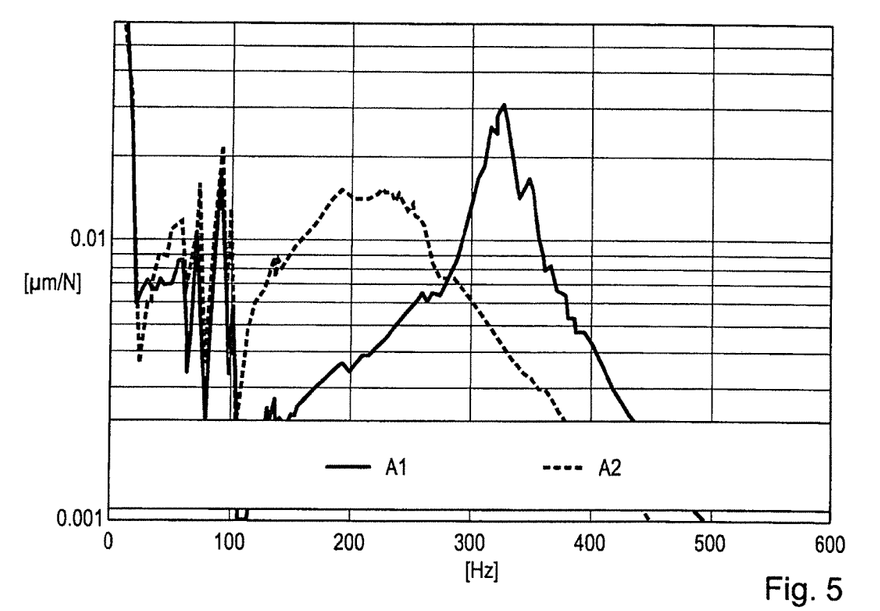
FIG. 5 is a diagram for illustrating dynamic compliances of a first type of spindles for grinding machines.
Figure 6:
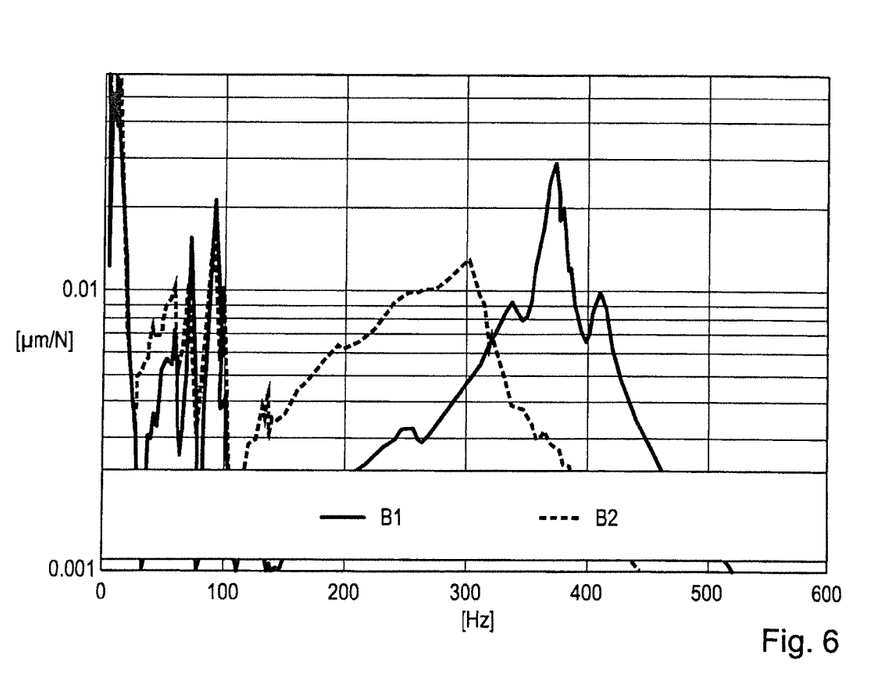
FIG. 6 is a diagram for illustrating dynamic compliances of a second type of spindles for grinding machines.

FIGS. 5 and 6 illustrate dynamic compliances (resilience frequency responses) of the regulator spindle in a working direction which coincides with the X-direction. The working direction X is regularly oriented in a fashion perpendicular to the longitudinal axis of the regulator spindle. At an axis of abscissas, frequency values in Hz (Hertz) are shown, respectively. At an ordinate axis, compliancy values in µm/N (micrometer per Newton) are presented. The ordinate axis comprises a logarithmic scale.

In FIG. 5, a graph designated by A1 elucidates the dynamic compliancy of a regulator spindle comprising a regulating wheel diameter of 350 mm (millimeter), which corresponds to a conventional type, which is hence not provided with a damping device in accordance with at least some aspects of the present disclosure. Accordingly, a graph which is designated by A2 elucidates the dynamic compliancy of a regulator spindle which also comprises a regulating wheel including a diameter of 350 mm, and which is further provided with a damping device which is arranged in a fashion at least similar to the exemplary embodiments illustrated with reference to FIGS. 3 and 4. It becomes apparent that the absolute dynamic compliancy is reduced by about 50% by the implementation of the damping device. Further, it may be inferred from FIG. 5 that a maximum of compliancy (approximately at 324 Hz) of the not-damped spindle may be shifted to significantly lower frequencies due to the implementation of the damping device. It is further apparent that the graph A2 which represents the compliancy of the damped spindle is significantly flatter in the relevant region.

In FIG. 6, a graph designated by B1 elucidates the dynamic compliancy of a regulator spindle which is provided with a regulating wheel comprising a diameter of 290 mm and which is not equipped with a damping device damping device in accordance with the present disclosure. In contrast, a graph designated by B2 elucidates the dynamic compliancy of a regulator spindle which is also provided with a regulating wheel comprising a diameter of 290 mm, wherein the regulator spindle is further equipped with a damping device in accordance with at least some aspects of the present disclosure. It may be inferred also from the representation in accordance with FIG. 6 that on the one hand a maximum compliancy is reduced by more than 50%. It becomes further apparent that the frequency where the maximum is present at a conventional regulator spindle (in FIG. 6 approx. 372 Hz by the graph B1) may be shifted to significantly lower frequencies by the implementation of damping device in accordance with the present disclosure. FIG. 6 further shows that the curve of the dynamic compliancy for the damped spindle B2 is less pointed than the corresponding curve B1 of the not-damped spindle.

In accordance with another exemplary embodiment, the damping effect proven based on FIGS. 5 and 6 may be achieved with spindles which are provided with the same damping device. In other words, in accordance with this exemplary embodiment, the damping device is adjusted in a "broad" sense in such a way that, regardless of an actual diameter of the selected regulating wheel, a significant improvement of the dynamic compliancy may be effected.

Figure 7:
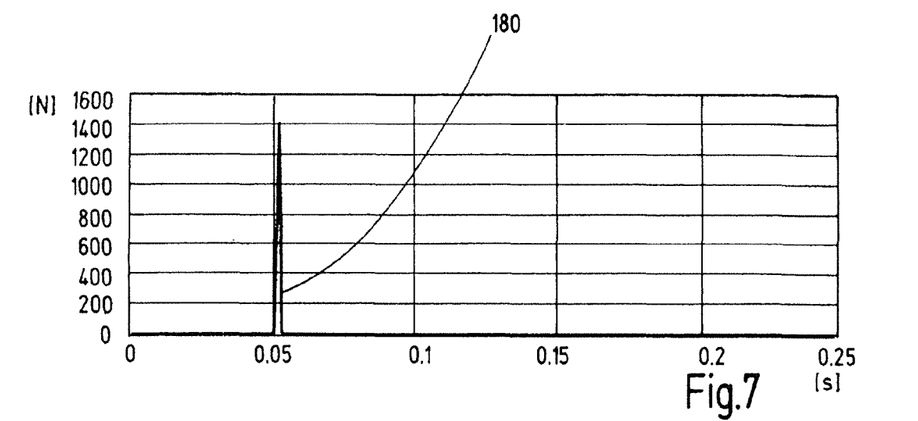
FIG. 7 is a diagram for illustrating an impulse-shaped excitation for detecting the decay behavior of a type of a spindle for a grinding machine.
Figure 8:
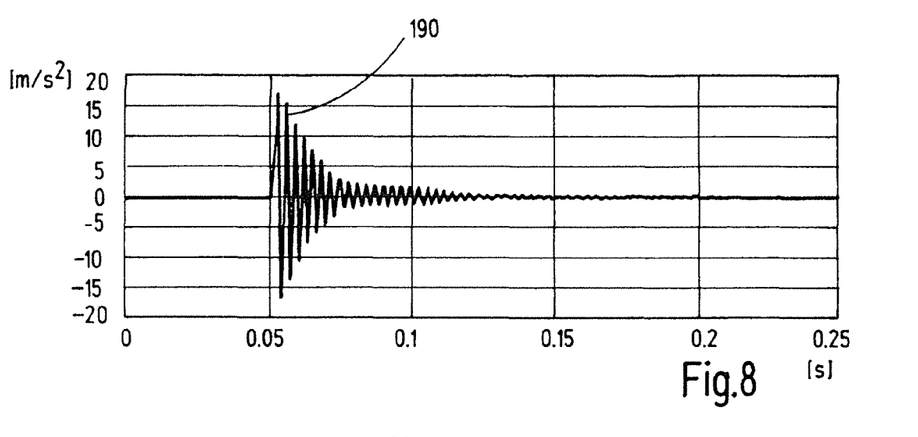
FIG. 8 is a diagram for illustrating a response of a conventionally arranged spindle to the impulse-shaped excitation illustrated in FIG. 7.
Figure 9:
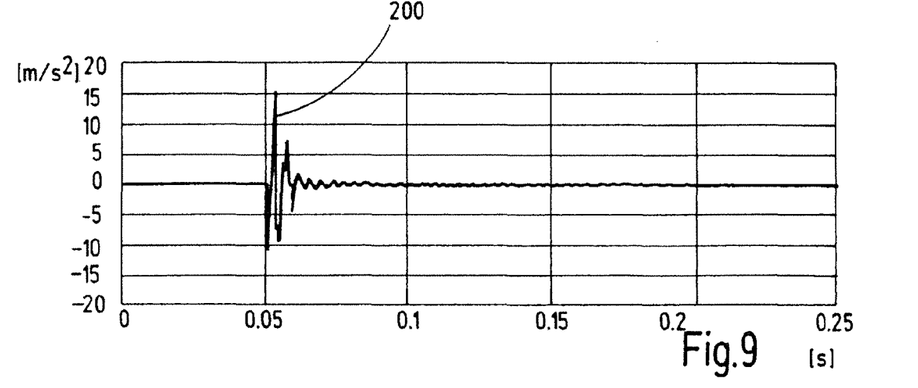
FIG. 9 is a diagram for illustrating a response of a spindle that is provided with a damping device to the impulse-shaped excitation illustrated in FIG. 7.

With reference to FIGS. 7, 8 and 9, the decay behavior of some spindles, particularly of some regulator spindles in response to an impulse-shaped excitation in the working direction (X-direction) is elucidated. In FIGS. 7, 8 and 9, the axis of abscissas respectively shows a time period in s (seconds).

FIG. 7 elucidates on the basis of a graph designated by 180 will temporal form of the impulse-shaped excitation. The ordinate of the graphic representation in accordance with FIG. 7 illustrates the impact force in N (Newton). At a time instant 0.05 s, a nearly ideal impulse-shaped excitation at a force of about 1400 N is applied. The impulse-shaped excitation is applied to both a regulator spindle of a conventional type, which is not equipped with a damping device in accordance with the present disclosure, refer to FIG. 8, and the excitation is also performed to a regulator spindle which is provided with a damping device which may correspond in substantial aspects thereof to the embodiments elucidates with reference to FIGS. 3 and 4, refer to FIG. 9. FIG. 8 and FIG. 9 elucidate a corresponding impulse response.

In FIGS. 8 and 9, the ordinate axis illustrates an acceleration in the X-direction (working direction) in m/s$^2$ which occurs as in reaction to the impulse-shaped excitation. A graph which is indicated in FIG. 8 by 190 shows that the conventional regulator spindle requires a long time for the decay. Particularly, at least in the range between 0.05 s and 0.1 s, clearly visible post-vibrations are present. In contrast, a graph which is designated in FIG. 9 a by 200 elucidates that the regulator spindle which is provided with the damping device comprises a significantly greater self-damping capability. Already after only a few amplitudes, the decay of the spindle is nearly entirely accomplished. At a time instant of 0.1 s, almost no vibrations are noticeable.

What is claimed is:

1. A centerless grinding machine, comprising:
a machine bed,
a grinding spindle, that is mounted for rotation relative to the machine bed, coupled to a spindle drive and arranged to receive a grinding wheel,
a regulator spindle that is mounted for rotation relative to the machine bed, coupled to a spindle drive and arranged to receive a regulating wheel,
a workpiece mount for receiving a to-be-processed workpiece between the grinding spindle and the regulator spindle,
wherein the grinding spindle and the regulator spindle are arranged at the machine bed and are moveable with respect to one another, and
wherein at least one of the grinding spindle and the regulator spindle comprises an integrated damping device, wherein the damping device comprises:
at least one damping unit, the at least one damping unit comprising:
an auxiliary mass section,
an elastic section, and
a damping section,
wherein the auxiliary mass section, the elastic section and the damping section are integrated in the spindle, and
wherein the auxiliary mass section, the elastic section and the damping section jointly form a damped vibratory system.

2. The grinding machine as claimed in claim 1, wherein the at least one of the grinding spindle and the regulator spindle further comprises a first neck and a second neck that define ends of the spindle which are facing away from one another other, wherein the first neck and the second neck are connected to one another via a hollow profile section, and wherein the damping device is accommodated in the hollow profile section between the first neck and the second neck.

3. The grinding machine as claimed in claim 1, wherein the damping device comprises at least one cavity and at least one compensation element, wherein the at least
one cavity contains a damping fluid, wherein the damping behavior of the damping device is defined by selecting a viscosity of the damping fluid, and wherein the at least one compensation element is configured for compensating pressure variations and volume variations of the damping fluid in the at least one cavity.

4. A centerless grinding machine comprising a machine bed and at least one spindle mounted for rotation relative to the machine bed, the at least one spindle having a damping device, comprising at least one damping unit, the damping unit comprising an auxiliary mass section, an elastic section and a damping section, wherein the auxiliary mass section, the elastic section and the damping section are integrated in the spindle, and wherein the auxiliary mass section, the elastic section and the damping section jointly form a damped vibratory system.

5. The grinding machine as claimed in claim 4, wherein the damped vibratory system is arranged as a passive damped vibratory system and configured to increase the dynamic stiffness of the spindle.

6. The grinding machine as claimed in claim 4, wherein the damping device is implemented in a grinding spindle or a regulator spindle of a centerless grinding machine.

7. The grinding machine as claimed in claim 4, wherein the auxiliary mass section, the elastic section and the damping section are accommodated in a hollow profile section of the spindle.

8. The grinding machine as claimed in claim 4, wherein the damping section comprises at least one cavity that is fillable with a damping fluid, and wherein the damping behavior of the damping device is defined by selecting a viscosity of the damping fluid.

9. The grinding machine as claimed in claim 8, wherein the damping fluid is a silicone oil, having a kinetic viscosity in the range of about 50 mm2/s to about 1,000 mm2/s.

10. The grinding machine as claimed in claim 8, further comprising at least one compensation element, wherein the at least one compensation element is configured for compensating pressure variations or volume variations of the damping fluid in the at least one cavity.

11. The grinding machine as claimed in claim 10, wherein the at least one compensation element is formed from a cellular rubber elastomer material.

12. The grinding machine as claimed in claim 4, wherein the at least one damping unit comprises a first damping unit and a second damping unit wherein the first damping unit is arranged at first spindle section, wherein the second damping unit is arranged at a second spindle section, and wherein the first damping unit and the second damping unit are axially adjacent one another and facing each other.

13. The grinding machine as claimed in claim 12, further comprising a common damping section for the first damping unit and the second damping unit and extending therebetween, wherein the damping section comprises at least one cavity that is arranged to receive and contain a damping fluid.

14. A centerless grinding machine comprising:
a machine bed, and a grinding spindle and a regulator spindle mounted for rotation relative to the machine bed, at least one of the grinding spindle and the regulator spindle being drivable about its longitudinal axis in a rotating fashion, the spindle comprising a damping device comprising at least one damping unit, the damping unit comprising an auxiliary mass section, an elastic section and a damping section, wherein the auxiliary mass section, the elastic section and the damping section are integrated in the spindle, and wherein the auxiliary mass section, the elastic section and the damping section jointly form a damped vibratory system.

15. The grinding machine as claimed in claim 14, further comprising a first neck and a second neck that define ends of the spindle that are facing away from each other, wherein the first neck and the second neck are connected to one another via a hollow profile section, and wherein the damping device is accommodated in the hollow profile section between the first neck and the second neck.

16. The grinding machine as claimed in claim 15, wherein the first neck is associated with a first spindle section, wherein the second neck is associated with a second spindle section, wherein the first spindle section and the second spindle section are mediately connected to one another via the hollow profile section, wherein at least the first spindle section or the second spindle section is provided with, the auxiliary mass section and wherein the auxiliary mass section is surrounded by the hollow profile section.

17. The grinding machine as claimed in claim 16, wherein the auxillary mass section comprises a first auxillary mass section that is integrally formed with the first neck of the first spindle section, the elastic section comprising a first elastic section arranged at the first spindle section, wherein the first elastic section is formed by a material weakening in the first spindle section that is arranged between the first auxiliary mass section and the first neck, and wherein the first elastic section is surrounded by the hollow profile section.

18. The grinding machine as claimed in claim 16, wherein the first spindle section comprises a first auxiliary mass section, wherein the second spindle section comprises a second auxiliary mass section, wherein the first auxiliary mass section is delimited by a first material weakening in the first spindle section that forms a first elastic section, wherein the second auxiliary mass section is delimited by a second material weakening in the second spindle section that forms a second elastic section, wherein the first auxiliary mass section and the first material weakening are formed at a first damping unit, wherein the second auxiliary mass section and the second material weakening are formed at a second damping unit, and wherein the first auxiliary mass section and the second auxiliary mass section are facing each other and are commonly surrounded by the hollow profile section.

19. The grinding machine as claimed in claim 18, wherein the first elastic section is formed by a first groove having a first diameter, wherein the second elastic section is formed by a second groove having a second diameter, and wherein the first diameter and the second diameter differ from one another.

20. The grinding machine as claimed in claim 15, wherein the damping section is arranged as a cavity for containing a damping fluid, wherein the cavity is delimited by the at least one auxiliary mass section and the hollow profile section, wherein at least one inlet opening for the damping fluid is provided in the hollow profile section, and wherein the inlet opening is, in a closed state, sealingly closed.

* * * * *